Oct. 24, 1961 A. I. ZAGAR 3,005,527
POSITIVE DRIVE TAPPING ATTACHMENTS
Filed Nov. 17, 1958
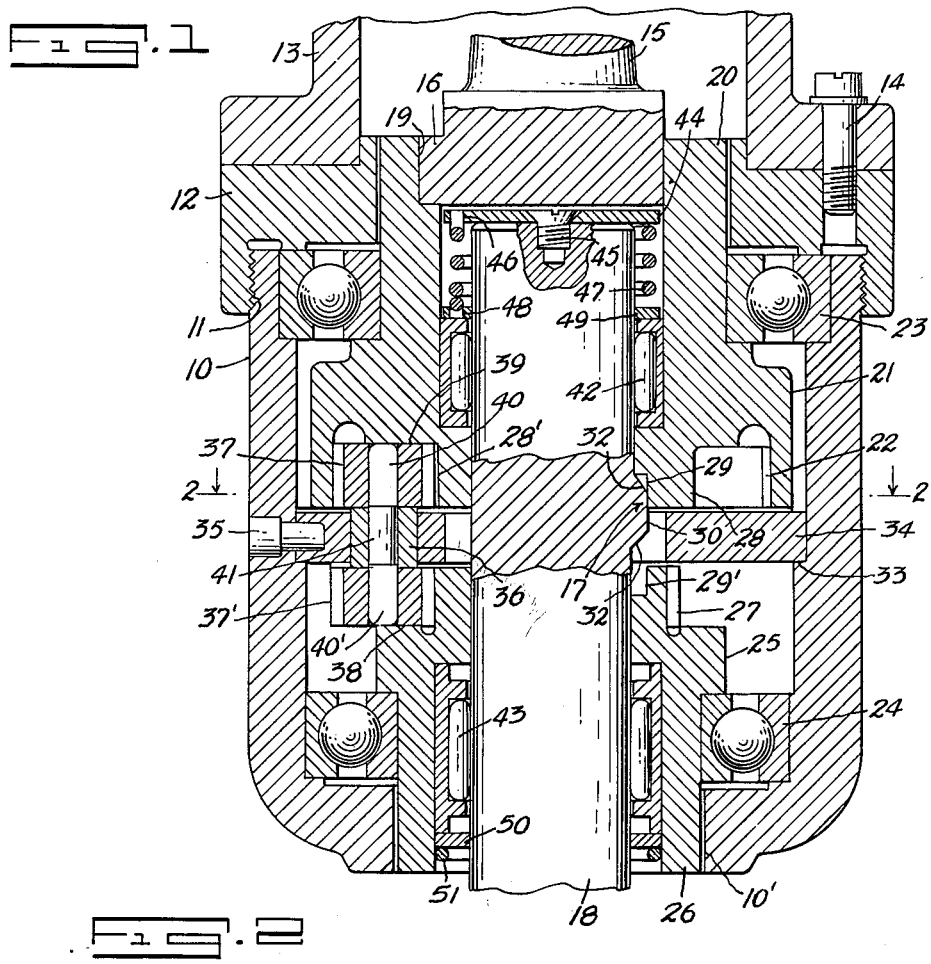
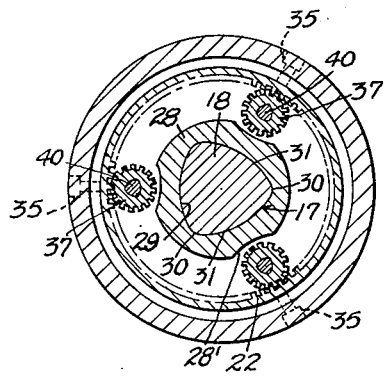
*INVENTOR.*
ASHER I. ZAGAR
BY
Howard E. Thompson
ATTORNEY

United States Patent Office 3,005,527
Patented Oct. 24, 1961

3,005,527
POSITIVE DRIVE TAPPING ATTACHMENTS
Asher I. Zagar, Brooklyn, N.Y., assignor to Ettco Tool & Machine Co., Inc., Brooklyn, N.Y., a corporation of New York
Filed Nov. 17, 1958, Ser. No. 774,259
1 Claim. (Cl. 192—51)

This invention relates to tapping attachments, wherein internal and external forward and reverse drive gears are provided for forward and reverse drive of the attachment and, wherein, a series of circumferentially spaced pinion units are mounted within the casing of the attachment in establishing drive between the forward and reverse gears.

More particularly, the invention deals with a structure of this type and kind, wherein the forward and reverse gears have, on adjacent surfaces thereof, polygon key sockets and the driven spindle of the attachment polygon key members operatively engaging the sockets in establishing forward and reverse drives of said driven spindle.

Still more particularly, the invention deals with a positive drive attachment of the character described, wherein the overall dimensions of the attachment are materially reduced in weight and size by virtue of the type of gearing employed, thus effecting a material reduction in the cost of the attachment.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a broken sectional view through an attachment made according to my invention, with parts of the construction shown in elevation and omitting part of the background showing; and FIG. 2 is a reduced section on the line 2—2 of FIG. 1.

In the drawing, I have shown at 10 a casing, having an upper large open end, externally threaded, as seen at 11, to receive a ring-like closure 12, in conjunction with which a supporting bracket indicated, in part, at 13 is attached through the medium of several screws, one of which is seen at 14.

Arranged within the bracket 13 in a drive spindle 15 which has a polygon clutch head 16, generally of the cross-sectional contour of the polygon clutch head 17 of a driven spindle 18, the clutch head 17 being shown in section in FIG. 2 of the drawing.

The head 16 of the drive spindle 15 operates in a polygon key socket 19 in the upper sleeve portion 20 of the forward drive member 21, having internal teeth indicated, in part, at 22. The background showing of the teeth 22 is omitted in FIG. 1 for simplification in the illustration. The sleeve 20 has a drive fit in a ball bearing 23 supported in the upper end of the casing 10. Another ball bearing 24 is supported in the lower portion of the casing 10 and a reverse gear member 25 includes a sleeve portion 26 which has a drive fit in the bearing 24, the sleeve portion 26 extending to the lower end of the casing 10, or, in other words, is arranged in an opening 10' in the lower end of the casing and freely rotatable therein.

The member 25 includes an external gear portion 27. It will also appear that the member 21 has a short depending sleeve portion 28 and this portion includes a polygon key socket 29 and a similar socket 29' is disposed within the gear portion 27, as clearly noted in FIG. 1 of the drawing.

The polygon head 17 of the spindle 18 comprises three circumferentially spaced rounded key members 30 joined by rounded surfaces 31.

It will also appear, from a consideration of FIG. 1 of the drawing, that upper and lower surfaces of the members 30 are bevelled, as seen at 32, thus providing free guidance for the members 30 into the sockets 29, 29' in establishing the forward and reverse drive of the spindle 18 by the members 21, 25.

Supported substantially centrally of the casing 10 on a shoulder 33 is a ring 34, preferably keyed against rotation by three key pins 35, one of which is shown in elevation in FIG. 1 and the others of which are indicated in FIG. 2 of the drawing.

The ring 34 has three circumferentially spaced apertures, in which bearing bushings 36 are mounted, one only of these bushings being illustrated in FIG. 1 of the drawing, the depth of the bushings being preferably greater than the thickness of the ring 34, so as to support pinion units comprising upper and lower pinions 37, 37' in spaced relation to the ring to avoid frictional engagement therewith.

Considering FIG. 2 of the drawing, it will appear that the sleeve portion 28 is recessed, as seen at 28', to clear the upper pinions 37, and these upper pinions 37 mesh with the internal gear 22 of the member 21. The lower pinions 37', in turn, mesh with the external gear 27 of the member 25. The member 25 has an extended surface 38 supporting the pinions 37' and the member 21 includes a surface 39 adjacent the upper surfaces of the pinions 37.

The pinions 37, 37' are keyed together by polygon ends 40, 40' of pins which have rounded central portions 41 freely rotatable in the bushings 36. It will thus be apparent that the pinions 37, 37' are definitely keyed together and operate as one in establishing the drive connection between the members 21 and 25 and, by virtue of the arrangement, the forward drive member 21 will reversely drive the member 25.

Arranged in the sleeve portions 20, 26 of the members 21, 25 are roller bearings 42 and 43, respectively, for free rotation of the driven spindle 18 therein. Also arranged in the sleeve 20 is a disc 44, fixed to the upper end of the spindle 18 by a screw 45, the disc having an aperture 46 for receiving one end of a spring 47, the other end of the spring fitting in an aperture 48 of a ring 49, the ring 49 seating on the bearing 42.

By reason of this construction, the spring 47 is free to rotate with the driven spindle 18 and the spring will serve to normally support the clutch head 17 of the spindle 18 in operative engagement with the member 21 while, at the same time, will permit the head 17 to move into engagement with the socket 29' of the member 25 in the reverse drive of the attachment. A suitable packing ring 50 is supported outwardly of the bearing 43 in the sleeve 26 by a spring ring 51.

The lower end of the driven spindle 18 may be directly coupled, by suitable means, with a tap to be utilized in operation of the attachment, or an adaptor head can be coupled therewith in accordance with the teachings in a companion application filed November 17, 1958, Serial No. 774,281.

In the operation of the attachment, the polygon head 17 normally engages the socket 29 in the direct drive of the attachment and is urged in this operative position by the spring 47. However, in the operation of removing the tool or tap, in upward movement of the attachment, the driven shaft 18 would be actuatable to move the head from the socket 29 into the socket 29' of the reverse drive gear 27, this action being against the tension of the spring 47. In the reverse drive, the tool will be withdrawn from the workpiece.

Having fully described my invention, what I claim as new and desire to secure by Letters Patent is:

In a clutch device, a forward drive member, a reverse drive member, means comprising circumferentially spaced pinion units placing the forward drive member in operative engagement with said reverse drive member, a driven shaft having an integral polygon clutch head arranged between and independently engaging both of said members, said members having on adjacent surfaces polygon sockets for reception of said head, means mounted on said driven shaft and operatively engaging the forward drive member for normally supporting said head in the socket of said forward drive member in the forward drive of said shaft, said shaft being actuatable to move the head from the first socket into the socket of the reverse drive member in the reverse drive of said driven shaft, and said means comprising a coil spring arranged integrally within the forward drive member and fixed to and rotatable with said driven shaft.

References Cited in the file of this patent

UNITED STATES PATENTS

| | | | |
|---|---|---|---|
| Re. 14,806 | Neville | Feb. 17, | 1920 |
| 282,322 | Hopkins | July 31, | 1883 |
| 1,077,776 | Williams | Nov. 4, | 1913 |
| 1,381,197 | John | June 14, | 1921 |
| 1,424,501 | McIntosh et al. | Aug. 1, | 1922 |
| 2,012,340 | Emrick | Aug. 27, | 1935 |
| 2,191,528 | Hewel | Feb. 27, | 1940 |
| 2,231,465 | Emrick | Feb. 11, | 1941 |
| 2,438,216 | Jessen | Mar. 23, | 1948 |
| 2,737,425 | Fisher | Mar. 6, | 1956 |
| 2,804,322 | Herzog | Aug. 27, | 1957 |
| 2,849,094 | Vaiden | Aug. 26, | 1958 |